United States Patent [19]

Wayman et al.

[11] Patent Number: 4,548,099
[45] Date of Patent: Oct. 22, 1985

[54] TORQUE RATIO CONTROL DEVICE FOR A V-BELT TYPE CONTINUOUSLY VARIABLE TRANSMISSION

[75] Inventors: Robert W. Wayman; Mutsumi Kawamoto, both of Nagoya; Shiro Sakakibara, Anjo, all of Japan

[73] Assignee: Aisin-Warner K. K., Aichi, Japan

[21] Appl. No.: 581,540

[22] Filed: Feb. 21, 1984

Related U.S. Application Data

[63] Continuation of Ser. No. 202,154, Oct. 30, 1980.

[30] Foreign Application Priority Data

Oct. 30, 1979 [JP] Japan .................. 54-141032

[51] Int. Cl.⁴ .................. F16H 37/00; F16H 37/06
[52] U.S. Cl. .................. 74/689; 74/701; 74/681
[58] Field of Search .................. 74/689, 700, 701, 714, 74/788, 730, 740, 681

[56] References Cited

U.S. PATENT DOCUMENTS

| | | | |
|---|---|---|---|
| 1,246,155 | 11/1917 | Pillmore | 74/714 |
| 2,648,236 | 8/1953 | Wilson | 74/714 |
| 2,968,190 | 1/1961 | Orr | 74/788 X |
| 3,093,013 | 6/1963 | Förster et al. | 74/788 |
| 3,152,490 | 10/1964 | Lemieux | 74/689 |
| 3,203,277 | 7/1965 | General | 74/689 |
| 3,257,243 | 5/1966 | Kress | 74/740 |
| 3,340,749 | 9/1967 | Magg | 74/689 |
| 3,479,908 | 11/1969 | Kress et al. | 74/689 |
| 3,538,789 | 11/1970 | Quick et al. | 74/689 |
| 3,670,594 | 6/1972 | Roper | 74/689 |
| 3,915,031 | 10/1975 | Hauson | 74/714 |
| 4,060,012 | 11/1977 | Giacosa | 74/689 |
| 4,074,591 | 2/1978 | Dick | 74/714 |
| 4,133,225 | 1/1979 | Love | 74/689 |
| 4,241,618 | 12/1980 | Smirl | 74/740 |
| 4,290,320 | 9/1981 | Abbott | 74/689 |

FOREIGN PATENT DOCUMENTS

| | | | |
|---|---|---|---|
| 0004130 | 9/1979 | European Pat. Off. | 74/689 |
| 0004412 | 10/1979 | European Pat. Off. | 74/689 |
| 1120235 | 12/1961 | Fed. Rep. of Germany | 74/689 |
| 2360017 | 3/1978 | France | 74/788 |

*Primary Examiner*—George H. Krizmanich
*Assistant Examiner*—Dirk Wright
*Attorney, Agent, or Firm*—Cooper, Dunham, Clark, Griffin & Moran

[57] ABSTRACT

The transmission comprises a hydraulic power transmission device, a V-belt stepless shifter and a planetary gear train. At restart time when the vehicle is at rest with the V-belt stepless shifter in high gear, the hydraulic power transmission device is operated to shift for providing a relatively high torque ratio, rather than the V-belt stepless shifter. A smooth restart is thus made possible. In addition, the planetary gear train permits the shifter smoothly to switch between forward and reverse. Both features meet the transmission needs of all vehicles.

7 Claims, 4 Drawing Figures

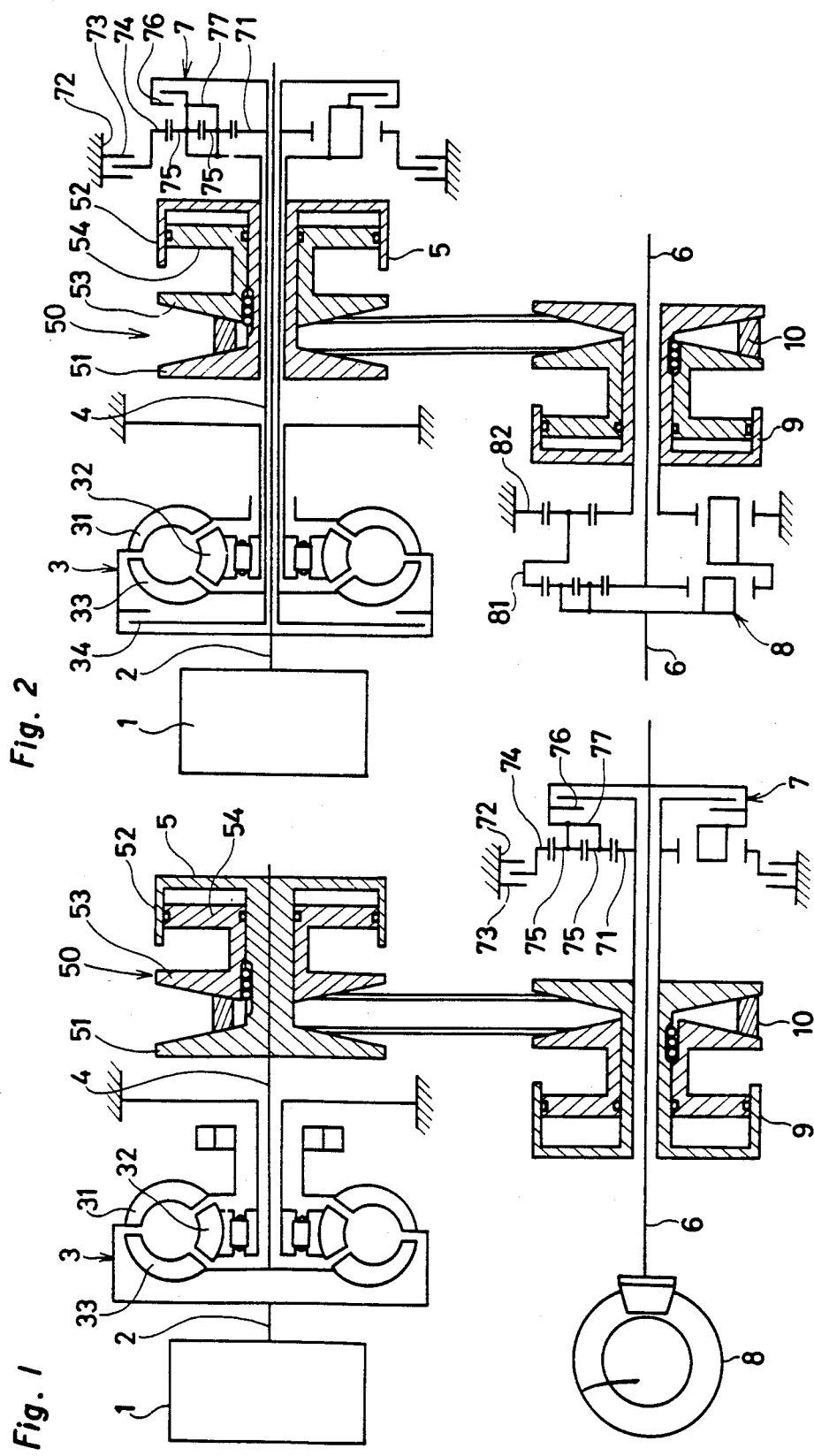

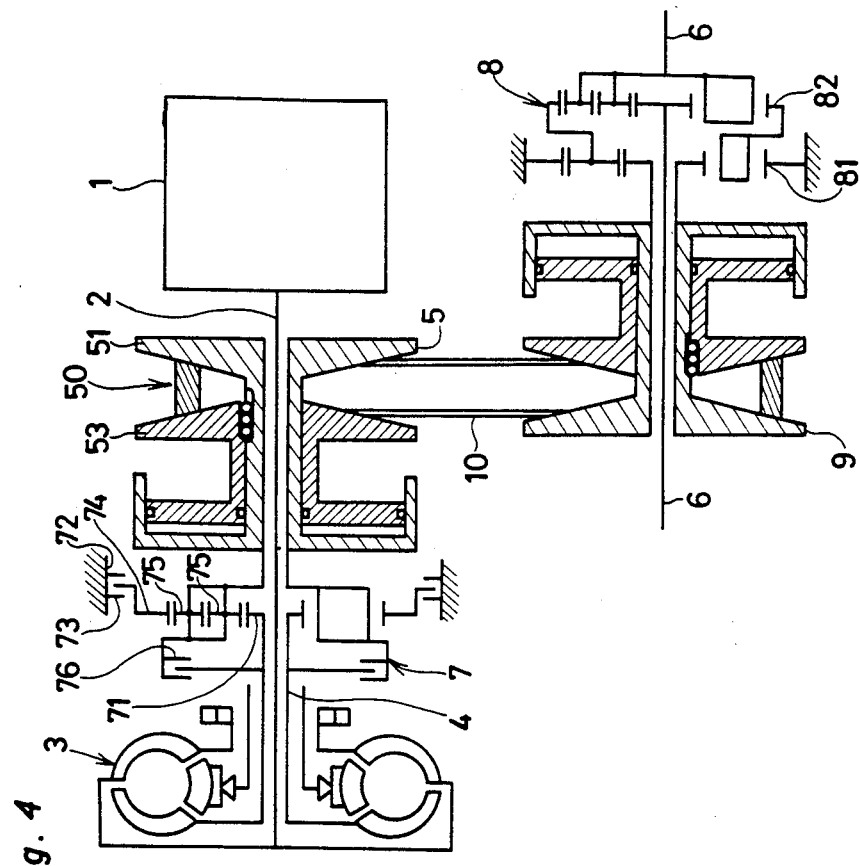
Fig. 3
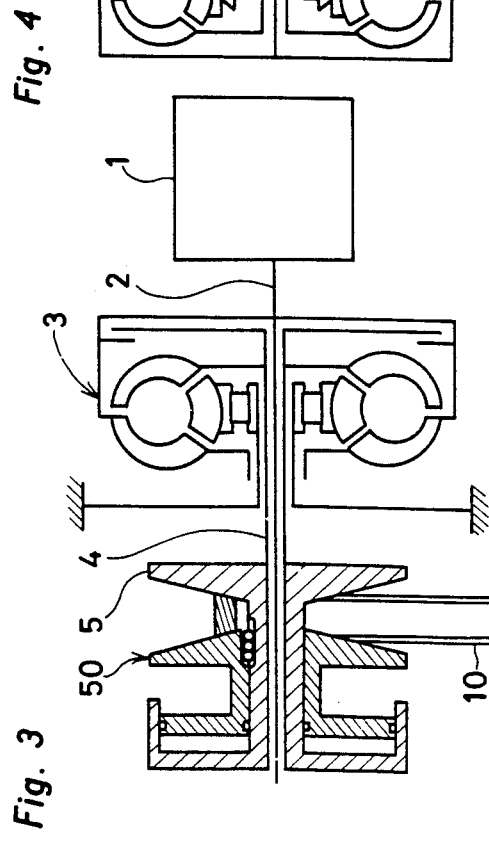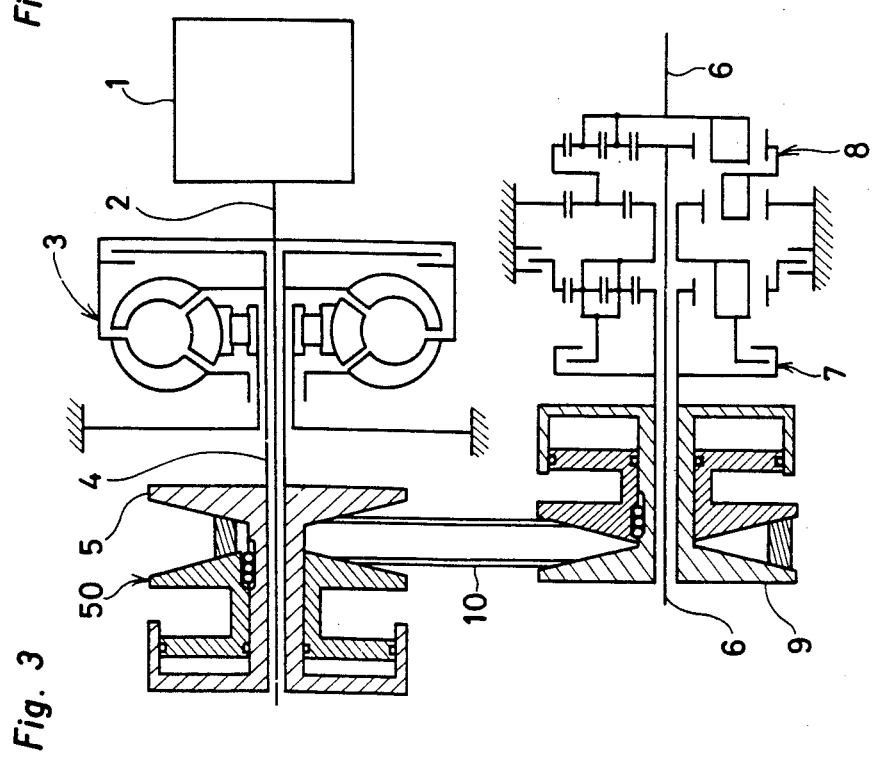
Fig. 4

TORQUE RATIO CONTROL DEVICE FOR A V-BELT TYPE CONTINUOUSLY VARIABLE TRANSMISSION

This is a continuation of application Ser. No. 202,154, filed Oct. 30, 1980.

BACKGROUND OF THE INVENTION

1. Field of the Invention

The present invention relates generally to a transmission mainly to be used in the hydraulic power transmission system on an automotive vehicle, and more particularly to an improved transmission including a hydraulic power transmission device which can provide an alternative shift function to the stepless shifter which fails to perform its shift function when it is desired to restart the vehicle at rest, permitting a smooth restart of the vehicle.

2. Description of the Prior Art

The use of a stepless shifter as an automotive vehicle's transmissions has been proposed. It is known, however, that the stepless shifter presents disadvantages since the shifting cannot be accomplished easily or without difficulty when the vehicle is at rest. For this reason, after the vehicle has stopped with a lower reduction ratio selected in the stepless shifter, it is difficult to restart the vehicle smoothly because such lower reduction ratio produced a smaller torque at the restart time.

OBJECTS OF THE INVENTION

It is therefore one object of the present invention to provide an improved transmission which incorporates a belt-type stepless shifter and is arranged to permit a vehicle to restart smoothly regardless of its reduction ratios selected at rest.

It is another object of the present invention to provide an improved transmission which provides a relatively reduction ratio at the restart time even after the vehicle has stopped with a lower reduction selected in the stepless shifter.

A further object of the present invention is to provide an improved transmission which permits a switching between forward speeds and reverse.

BRIEF DESCRIPTION OF THE DRAWINGS

Those and other objects and advantages of the present invention will become apparent from the description of several preferred embodiments of the invention which is later to be made by referring to the accompanying drawings, in which:

FIG. 1 is a schematic diagram illustrating a transmission arrangement according to a first preferred embodiment of the present invention;

FIG. 2 is a schematic diagram of the second preferred embodiment of the invention;

FIG. 3 is a schematic diagram of a third preferred embodiment of the invention; and FIG. 4 is a schematic diagram of a fourth preferred embodiment of the invention.

DETAILED DESCRIPTION OF PREFERRED EMBODIMENTS

Referring to the drawings, several preferred embodiments of the present invention are now described in further detail.

A first preferred embodiment is shown in FIG. 1, in which a transmission is configured suitably for use with a front engine and front-wheel drive (F-F type) longitudinal engine vehicle. In FIG. 1, a vehicle engine 1 is provided in a position as shown from which an engine output shaft 2 extends toward a hydraulic power transmission device 3 which in this embodiment has the form of a hydraulic torque converter (fluid coupling). The hydraulic power transmission device 3, which is per se known, includes a pump impeller 31 connected to the engine output shaft 31, a startor 32, and a turbine runner 33 connected with the output shaft 4 of the torque converter. Adjacent to the torque converter, a V-belt stepless shifter 50 includes a pulley assembly 5 secured to the torque converter output shaft 4, a further pulley assembly 9 secured to a transmission output shaft 6 disposed in parallel with the torque converter output shaft 4, the link between the pulley assembly 9 and output shaft 6 being made by way of a planetary gear train 7 which includes friction engaging elements selectively operated for providing forward speeds and reverse, and a V-belt 10 connecting between the pulley assemblies 5 and 9. The pulley assembly 5, known per se, has a stationary flange 51, an annular cylinder 52 formed integrally with the stationary flange 51, a movable cylinder 53, and an annular portion 54 formed integrally with the movable cylinder 53 and sliding inside the annular cylinder 52. The pulley assembly 9 has a similar construction to the pulley assembly 5. The planetary gear train assembly 7 comprises a central or sun gear 71 coupled with the stationary flange 51 of the pulley 9, a ring gear 74 secured to the housing 72 by way of a multiplate brake assembly 73 forming one of the friction engaging elements, a double pinion 75 meshing with both the sun gear 71 and ring gear 74, and a rovolving carrier 77 linked with the output shaft 6 and also connected with the sun gear 71 by way of a multiplate clutch assembly 76 forming one of the friction engaging elements. In FIG. 1, reference numeral 8 designates a differential gear arrangement with a final reduction gearing.

In accordance with the transmission arrangement described above, for driving the vehicle forward, the clutch assembly 76 within the planetary gear train 7 is engaged and the brake assembly 73 is disengaged. Then, a rapid shifting at the start time is accomplished by the torque converter, while a usual mild shifting is done by the stepless shifter 50. Driving the vehicle backward is achieved by causing the clutch assembly 76 in the planetary gear train 7 to be released and the brake assembly 73 to be engaged.

Referring next to FIG. 2, a second preferred embodiment is described. In the second embodiment, a direct coupling clutch 34 is provided in the hydraulic torque converter 3. A planetary gear train 7 is disposed between the output shaft 4 of the planetary gear train 7 and a stepless shifter 50, the planetary gear train 7 having a central or sun gear 71 secured to the torque converter output shaft 4, and a revolving carrier 77 secured to a stationary flange 51 of a pulley 5. A reduction gearing 81 includes a final reduction gear 82 and a differential gear 81, and is coupled to a pulley 9. A transmission output shaft 6 has one side thereof extending through the connection with the differential gear 81, and the other side extending through the pulley assembly 9. The transmission arrangement shown in FIG. 2 has a power train form adapted for being installed on an F-F type horizontal engine vehicle. As shown, the planetary gear train 7 is located on the input side of the stepless shifter 50, and it is therefore possible to design the gear part of the planetary gear train 7 such that it can provide a virtually smaller capacity.

In accordance with a third embodiment shown in FIG. 3, a planetary gear train 7 is disposed between a stepless shifter 50 and a transmission output shaft 6 in the same way as in the first embodiment of FIG. 1. However, the third embodiment is varied in that the planetary gear train 7 is formed as an integral part of the differential gear 8, which has the output shaft parts 6, extending on the opposite sides thereof. The varied form of the transmission in FIG. 3 is a power train suited for mount on an F-F type horizontal engine vehicle.

A fourth preferred embodiment of FIG. 4 is configured similarly to the second embodiment of FIG. 2 in that a planetary gear train 7 is disposed between a thorque converter output shaft 4 and a stepless shifter 50, but is varied such that a pulley assembly 9 of the stepless shifter 50 and the planetary gear train 7 are disposed between the engine 1 and torque converter 3. The varied embodiment is a power train adapted for installing on an F-F type horizontal engine vehicle. As particularly shown, the hydraulic power transmission device or torque converter is located on the side opposite to the engine, and hence the output portion of the stepless shifter can practically be placed in the central position of the vehicle. In accordance with the arrangement shown in FIG. 4, therefore, it can permit an easy mount on any vehicle of such type.

As illustrated in FIG. 2, FIG. 3, FIG. 4, the output shaft 6 extends through the transmission apparatus, projecting on the opposite sides thereof. Therefore, each of the embodied forms in those figures is particularly suited to be installed on front-wheel driven, front-engine horizontally disposed vehicles.

As readily understood from the foregoing description, the transmission apparatus according to the present invention includes a hydraulic power transmission device, a stepless shifter and a planetary gear train which are all advantageously configured as shown in the various embodied forms, such that the hydraulic power transmission device or torque converter can perform shift functions on behalf of the stepless shifter which fails to do its shifting at the time of restart. Thus, a smooth restarting can be achieved under any vehicle shifted condition. An additional advantage is the possibility of producing a compact transmission size.

Although the present invention has been described with reference to the several preferred embodiments thereof, it should be understood that various changes and modifications may be made to the shown embodiments within the scope and spirit of the invention.

What is claimed is:

1. A variable transmission for automotive vehicles comprising:
    (a) an input shaft to be driven by an engine;
    (b) a hydraulic torque converter;
    (c) an output shaft to drive wheels, arranged parallel to said input shaft;
    (d) a V-belt stepless drive ratio shifting means comprising a drive pulley provided coaxially with said input shaft and a driven pulley provided coaxially with said output shaft, said drive pulley and said driven pulley being connected by a belt;
    (e) a planetary gear mechanism operating as a reverse shifting means, comprising a sun gear, a carrier, a ring gear, and a double pinion;
    (f) a brake to act selectively on said ring gear of said planetary gear mechanism; and
    (g) a clutch selectively engageable for connecting an output side with an input side of said planetary gear mechanism,
wherein a reduction gear mechanism and a differential gear mechanism are provided coaxially with said output shaft, and said differential gear mechanism being connected with said output shaft.

2. A variable transmission according to claim 1, wherein said torque converter and said drive pulley are coaxial with said input shaft and said planetary gear mechanism is coaxial with said output shaft, the sun gear of said planetary gear mechanism being connected to said driven pulley and said carrier thereof being connected with said output shaft.

3. A variable transmission according to claim 1, wherein said torque converter, said drive pulley and said planetary gear mechanism are coaxial with said input shaft, an output shaft of said torque converter being connected to the sun gear of the planetary gear mechanism by passing through the center of said drive pulley, said drive pulley being connected with the carrier of said planetary gear mechanism, and said driven pulley being connected with said reduction gear mechanism.

4. A variable transmission according to claim 1 wherein said torque converter, said planetary gear mechanism, and said drive pulley are coaxial with said input shaft, said input shaft being connected with said torque converter by passing through the center of said drive pulley, said planetary gear mechanism and said torque converter, an output shaft of said torque converter being connected with the sun gear of said planetary gear mechanism, the carrier of said planetary gear mechanism being connected with said drive pulley and being connectable with the sun gear through said clutch, and said driven pulley is connected with said reduction gear mechanism.

5. A variable transmission for automotive vehicles comprising:
    (a) an input shaft to be driven by an engine;
    (b) a hydraulic torque converter;
    (c) an output shaft to drive wheels, arranged parallel to said input shaft;
    (d) a V-belt stepless drive ratio shifting means comprising a drive pulley provided coaxially with said input shaft and a driven pulley provided coaxially with said output shaft, said drive pulley and said driven pulley being connected by a belt;
    (e) a planetary gear mechanism operating as a reverse shifting means, comprising a sun gear, a carrier, a ring gear, and a double pinion;
    (f) a brake to act selectively on said ring gear of said planetary gear mechanism; and
    (g) a clutch selectively engageable for connecting an output side with an input side of said planetary gear mechanism, wherein a reduction gear mechanism and a differential gear mechanism are provided at right angles to said output shaft.

6. A variable transmission according to claim 1, said reduction gear mechanism comprises a planetary gear mechanism wherein a sun gear is arranged at an input side of said mechanism, a carrier is arranged at the input side of a differential gear mechanism, and a ring gear is always fixed.

7. A variable transmission according to claim 1, said differential gear mechanism comprises a planetary gear mechanism having a sun gear, a carrier, a ring gear, and a double pinion.

* * * * *